United States Patent [19]

Farr et al.

[11] Patent Number: 4,659,466

[45] Date of Patent: Apr. 21, 1987

[54] QUICK RELEASE COVER ASSEMBLY FOR A LIQUID FILTER HOUSING

[75] Inventors: Richard S. Farr, Los Angeles; Myron G. Rasmussen, Fullerton, both of Calif.

[73] Assignee: Farr Company, El Segundo, Calif.

[21] Appl. No.: 707,160

[22] Filed: Mar. 1, 1985

[51] Int. Cl.⁴ .............................................. B10D 35/30
[52] U.S. Cl. .................................. 210/238; 210/541; 210/542
[58] Field of Search ............... 210/541, 542, 232, 233, 210/234, 237, 238

[56] References Cited

U.S. PATENT DOCUMENTS 3,986,960 10/1976 Wire et al. .......................... 210/232
4,268,392 5/1981 Hayes .................................. 210/238

Primary Examiner—Frank Sever
Attorney, Agent, or Firm—Lyon & Lyon

[57] ABSTRACT

A quick release cover assembly for a cylindrical liquid filter housing which includes an outer cover plate pivotally mounted on the filter housing, an inner cover plate having a beveled cylindrical side wall and being carried by the outer plate and an O-ring which is disposed about the beveled wall of the inner plate adjacent the under side of the outer plate. A plurality of locking dogs are carried by the upper surface of the outer plate which are adapted to be inserted and rotated within a corresponding plurality of L-shaped slots adjacent the open end of the filter housing. A threaded fastener is provided for drawing the inner and outer plates together upon the locking dogs being so disposed within the slots in the housing so as to press the O-ring outwardly against the interior wall of the filter housing thereby releasably sealing the cover assembly to the housing. An inner lock bar is slidably mounted on the outer cover which is adapted to be slided into one of the L-shaped slots in the housing adjacent the locking dog extending therethrough. The inner lock bar prevents tighten of the threaded fastener and squeezing of the O-ring against the housing prior to the locking dogs being properly disposed in the housing slots and, upon being slided into one of the housing slots prevents rotation of the cover assembly with respect to the filter housing.

16 Claims, 4 Drawing Figures

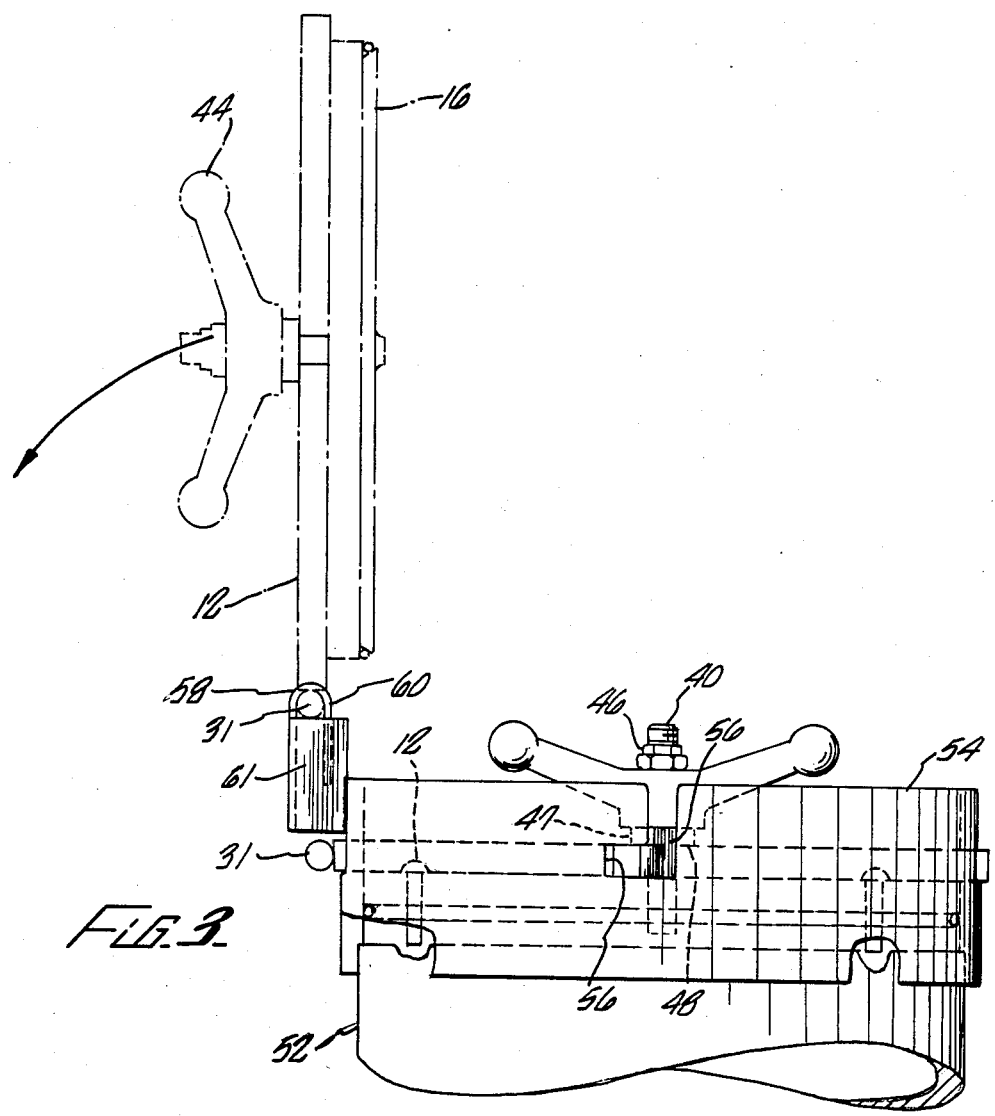
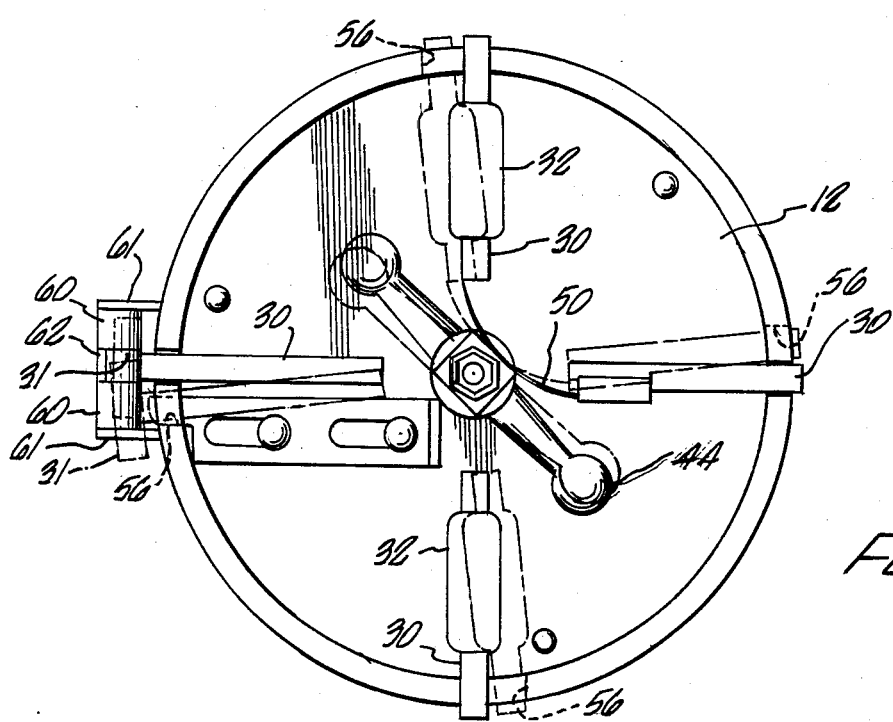

QUICK RELEASE COVER ASSEMBLY FOR A LIQUID FILTER HOUSING

BACKGROUND OF THE INVENTION

The present invention relates to a quick release cover assembly for liquid filter housings such as those used for filtering fuel and oil on diesel locomotives. Such covers must provide a tight seal to prevent fluid leakage and be removable to allow access to the filter housing interior to enable one to replace the filter element held therein. The liquid filter housings currently in use generally employ multiple swing mounted bolts for securement of the access cover. While such an arrangement provides the necessary fluid tight seal when properly secured, the bolts and the protruding ears on the housing by which the bolts are held occupy an inordinate amount of exterior space. Further, improper securement of the bolts can result in leakage and changing of the filter elements requires an excessive amount of time and labor. Because these filters are used in the railroad industry, the fact that filter replacement requires the use of a tool prevents the filter element from being changed by an ordinary laborer, further increasing the time and hence the expense of the operation.

It would therefore be highly desirable to provide an access cover assembly for such filter elements which minimizes the chances for error in securing the cover to insure a fluid tight seal, which is easily removable without the use of a tool to facilitate filter replacement and which provides more access space about the filter housing to allow the housing to be accommodated in areas previously insufficient for that purpose. The cover assembly described and claimed herein attains these objectives.

SUMMARY OF THE INVENTION

Briefly the present invention comprises a cover assembly for a cylindrical liquid filter housing which includes an outer cover plate, an inner cover plate carried by the outer plate and having a beveled cylindrical side wall, and an O-ring disposed about said beveled side wall adjacent the perimeter of the under side of the outer plate. A plurality of locking dogs are provided on the upper plate which are adapted to be inserted into and rotated within L-shaped slots in the open end of the filter housing. Threaded fastening means are provided for drawing the inner and outer plates together upon the dogs being so disposed within the slots in the filter housing to press the O-ring outwardly against the interior wall of the housing thereby sealing the cover in place on the housing and providing a fluid tight seal therebetween. An inner lock bar is mounted on the outer housing cover which prevents tightening of the fastening means prior to the locking dogs being properly disposed within the filter housing and rotation of the cover assembly with respect to the filter housing upon the locking dogs being so disposed within the filter housing slots.

It is the principle object of the present invention to provide a removable cover assembly for a liquid filter housing which insures a secure and fluid tight fitment therebetween while facilitating filter element replacement.

It is another object of the present invention to provide removable cover for a liquid filter housing which prevents the formation of a fluid tight seal therebetween prior to proper securement of the cover to the housing.

It is a further object of the present invention to provide a removable cover for a fluid filter housing which provides for a simple and rapid securement and removal of the cover from the housing without the need for a separate tool.

It is yet another object of the present invention to provide an improved removable cover for a liquid filter housing which is of simple construction and economical to manufacture.

These and other objects and advantages of the present invention will become apparent from the following detailed description taken in conjunction with the accompanying drawings.

BRIEF DESCRIPTION OF THE DRAWINGS

FIG. 3 is a side view of the cover assembly of the present invention shown secured to the open end of a fluid filter housing and illustrating in fathom lines the cover assembly pivoted to the open position.

FIG. 4 is a top view of a portion of the cover assembly illustrating the locking of the cover assembly to the housing.

DESCRIPTION OF THE PREFERRED EMBODIMENT

Figure 1:
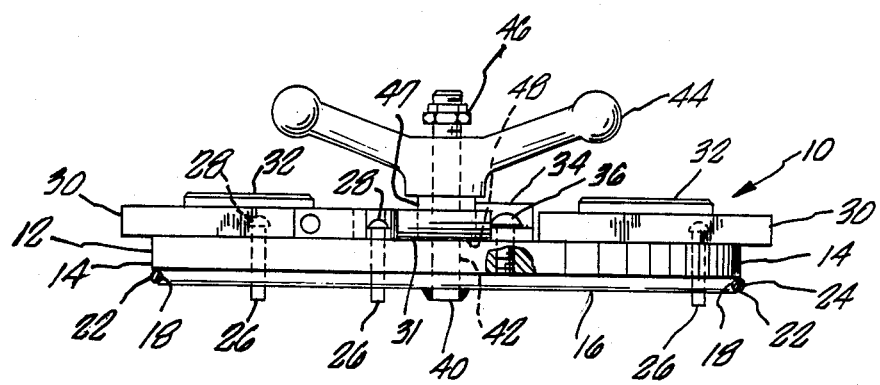
FIG. 1 is a side view of the cover assembly of the present invention.
Figure 2:
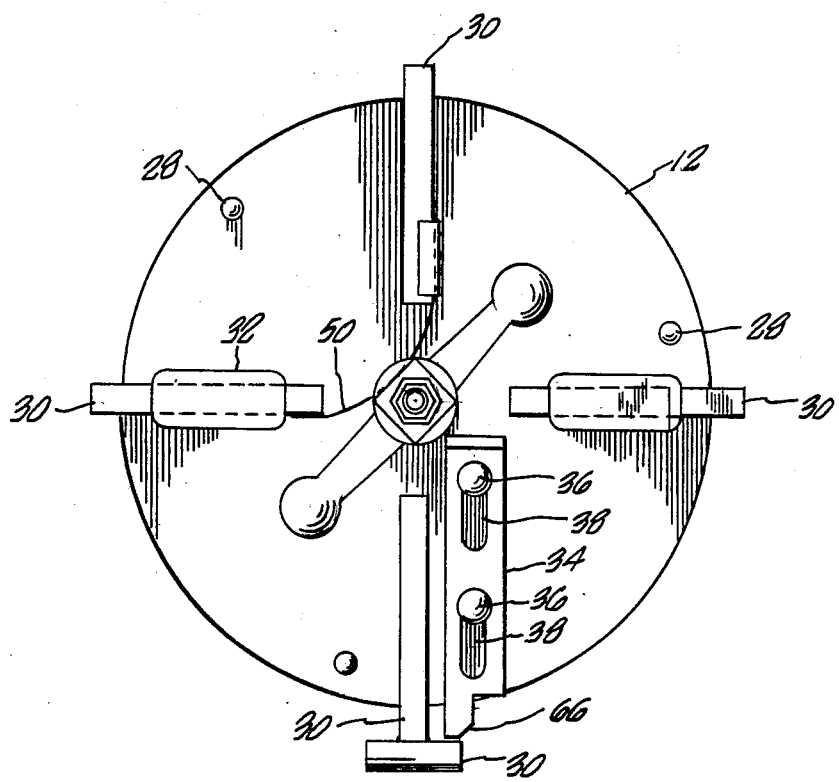
FIG. 2 is a top view of the cover assembly of the present invention.

The cover assembly 10 of the present invention comprises a flat outer cover plate 12 defining a cylindrical side wall 14 and a flat inner cover plate 16 having a slightly smaller diameter than plate 12 and defining a beveled side wall 18 which tapers downwardly and outwardly at about 25° with respect to the vertical from the under side 20 of the outer plate 12 so as to form a groove 22 therebetween. An O-ring 24 is disposed within groove 22 and extends about the beveled side wall 18. The inner plate 16 is secured to the outer plate 12 by pins or rivets 26 which are preferably welded to the inner plate 14, extend through apertures in the outer plate and are provided with enlarged head portions 28 which are disposed over the outer plate. The pins are sized in length so as to allow the inner and outer covers to move between in an abutting position to a spacing of about 0.14 inches.

A plurality of elongated locking dogs 30 [4 being shown] are equiangularly spaced on the upper surface of the outer cover plate and welded thereto such that they protrude about 0.5 inches therefrom. One of the dogs 30 has a cross bar 31 welded to the end thereof for pivotally mounting the cover assembly 10 on the filter housing in a manner to be described. Slightly curved plates 32 are preferably welded onto two of the dogs 30 to define lifting handles for facilitating handling of the cover plate assembly 10. An interlocking bar 34 is slidably mounted on the outer cover plate 12 parallel to one of the locking dogs 30 by means of rivets 36 and elongated slots 38 formed in the interlocking bar 34.

A threaded stud 40 is welded to the inner cover plate 18 and extends through a centrally disposed aperture 42 in the outer cover plate 12. A handle 44 is threadable engaged with stud 40 and held thereon by a lock nut 46. The lower bore portion 47 of handle 44 is square in cross section and the under side 48 thereof bears against the outer cover plate, pressing the inner and outer cover plates together upon tightening of the handle 44 on stud 40. A leaf spring 50 is secured at its ends between two of the locking dogs 30 such that it bows and bears against the square bore portion of the handle to prevent the handle from being loosened by vibration.

The cylindrical housing 52 is provided with a cylindrical cover adapter 54 which is welded or otherwise rigidly affixed to the open end of the housing and thus becomes a portion of the housing. The cover adapter 54 has a plurality of substantially L-shaped slots 56 formed in the outer end thereof which correspond in number and location to the dogs 30 on the outer cover plate 12. A U-shaped bracket 58 is affixed to the exterior of the cover adapter 54 above one of the slots 56 therein. The bracket 58 is comprised of two U-shaped arm portions 60 disposed between side wall portions 61 and define a slot 62 therebetween. The cross bar 31 on one of the locking dogs 30 on the cover plate 12 is inserted sideways into the slot and rotated whereupon the cross bar 31 extends between the arm portions 60 of the bracket 58 allowing the cover assembly 10 to be pivotally attached to the filter housing 52.

To secure the cover assembly 10 to the filter housing 52, the cover assembly is placed over the open end of the filter housing such that the locking dogs 30 pass through the open ends of the L-shaped slots 56 in the cover adapter 54. This position is illustrated in phantom lines in FIG. 4. The cover assembly 10 is then rotated clockwise so that the locking dogs 30 are moved to the closed bottom ends 64 of the slots 56. The interlocking bar 34 is then slided outwardly such that the extended end 66 thereof passes into the aligned slot 56 adjacent the dogs 30 protruding slightly therethrough. This locked position is illustrated in solid lines in FIG. 4. The extended end 66 of the interlocking bar 34 extending through the slot prevents the cover assembly 10 from rotating and thereby prevents the dogs 30 from inadvertently realigning themselves with the open ends of slots 56. The handle 44 is then tightened on stud 40 causing the plates 12 and 16 to be drawn together and the O-ring pressed outwardly against the interior wall of the cover adapter 54 forming a fluid tight seal between the beveled side wall 18 on the inner cover plate 16 and the interior wall of the cover plate adapter. Prior to sliding the interlock bar 34 into the locked position in the aligned slot 56, the rearward end 35 of the bar prevents the handle 44 from being so tightened. If the handle could be tightened on stud 40 and the O-ring seal formed without the locking dogs 30 being disposed within the slots 54 a pressure build up within the filter could result in the cover assembly 10 being blown off the filter housing. To remove the cover assembly 10 from the filter housing it is only necessary to reverse each of the aforesaid steps.

Various changes and modifications can be made in carrying out the present invention without departing from the spirit and scope thereof. Insofar as these changes and modifications are within the purview of the appended claims, they are to be considered as part of the present invention.

We claim:

1. A cover assembly for a liquid filter housing comprising an outer cover plate disposed under and carried by said outer cover plate, said inner cover plate having a diameter less than said outer cover plate and defining a beveled side wall spaced from the under side of said outer cover plate so as to define a groove therebetween, an annular sealing member disposed in said groove between said outer and inner cover plates and about a portion of said beveled side wall, a plurality of locking dogs secured to said outer cover plate and extending radially therefrom and being adapted to engage said filter housing, manually operable means disposed interiorly of said sealing member for drawing together said cover plates about said sealing member to press said sealing member outwardly therefrom whereby upon disposing said cover assembly on said filter housing such that said locking dogs engage said housing and drawing together said plates, said sealing member abuts said filter housing and forms a liquid tight seal between said filter housing and said cover assembly.

2. The combination of claim 1 including an interlocking bar mounted on said outer cover plate adjacent one of said locking dogs, said bar being slidable between an inner position and an extended position such that in said inner position said bar abuts said drawing means and prevents said means from drawing said plates together and in said extended position is adapted to engage said filter housing and secure said cover assembly to said filter housing.

3. The combination of claim 1 including a plurality of pin members secured to one of said plates and extending through the other of said plates, said pin members having enlarged head portions adapted to abut the other of said plates and maintain a spacing between said plates less than the tranverse dimension of said sealing member.

4. The combination of claim 1 wherein said drawing means comprises a stud secured to said inner cover plate and extending through said outer cover plate and a handle member threadably engaged with said stud such that upon rotating said handle member on said stud said handle member abuts said outer cover plate drawing said plate toward said inner cover plate and squeezing said sealing member therebetween such that said sealing member is pressed outwardly along said beveled side wall.

5. The combination of claim 2 including a hollow cylindrical member adapted to be secured to one end of said filter housing and define an extension thereof, said member having a plurality of substantially "L"-shaped slots therein, said slots being adapted to receive said locking dogs on said outer cover plate and one of said slots being adapted to additionally receive said extended portion of said inner locking bar upon said bar being slided to said extended position whereby relative rotation between said cover assembly and said filter housing is prevented.

6. The combination of claim 4 wherein said handle member defines a plurality of substantially flat stop surfaces and including a spring member secured to said outer cover plate such that said spring member is bowed and bears against one of said stop surfaces so as to resist rotation of said handle member on said stud.

7. A removable cover assembly for a liquid filter housing comprising: an outer cover plate; an inner cover plate disposed under and carried by said outer cover plate, said inner cover plate having a diameter less than said outer cover plate and defining a beveled side wall spaced from and extending downwardly and outwardly with respect to the underside of said outer cover plate so as to define a groove between said beveled side wall and the underside of said outer cover plate; a sealing member disposed in said groove and extending about said beveled side wall; means for maintaining a spacing between said cover plates less than the transverse dimension of said sealing member; a plurality of locking dogs secured to said outer cover plate, extending radially therefrom and being adapted to engage said filter housing; a stud secured to said inner cover plate and extending through said outer plate cover; and a handle member threadably engaging said stud such that upon rotation of said handle member on said stud said handle member abuts said outer cover plate, drawing said plate toward said inner cover plate and forcing said sealing member outwardly to form a liquid tight seal between said cover assembly and the filter housing.

8. The combination of claim 7 including an interlocking bar mounted on said outer cover plate adjacent one of said locking dogs, said bar being slidable between an inner position and an extended position such that in said inner position said bar abuts said drawing means and prevents said means from drawing said plates together and in said extended position is adapted to engage said filter housing and secure said cover assembly to said filter housing.

9. The combination of claim 8 including a hollow cylindrical member adapted to be secured to one end of said filter housing and define an extension thereof, said member having a plurality of substantially "L"-shaped slots therein, said slots being adapted to receive said locking dogs on said outer cover plate and one of said slots being adapted to additionally receive said extended portion of said inner locking bar upon said bar being slided to said extended position whereby relative rotation between said cover assembly and said filter housing is prevented.

10. The combination of claims 8 or 9 wherein said handle member defines a plurality of substantially flat stop surfaces and including a spring member secured to and extending between a pair of said locking bars such that said spring member is bowed between said bars and bears against one of said stop surfaces so as to resist rotation of said handle member on said stud.

11. A housing assembly particularly adapted for use as a liquid filter housing said assembly comprising; a cylindrical housing having a closed end and an open end, a plurality of substantially L-shaped slots formed in the open end of said housing, and a removable cover assembly adapted for sealing engagement with said open end of said housing, said assembly comprising an outer cover plate, an inner cover plate disposed under said outer cover plate, having a diameter less than said outer cover plate and defining a beveled side wall spaced from and extending downwardly and outwardly from the under side of said outer cover plate so as to define a groove between said beveled side wall and the under side of said outer cover plate, an annular sealing member disposed in said groove between said outer and inner cover plates and about a portion of said beveled side wall, a plurality of locking dogs secured to said outer cover plate, extending radially thereform and adapted to be inserted into and rotated within said slots in said filter housing to secure said cover assembly to said housing, and manually operable means disposed interiorly of said sealing member and extending between said cover plates for drawing said cover plates together about said sealing member to press said sealing member outwardly therefrom along said beveled side wall to form a fluid tight seal between said beveled side wall and said filter housing.

12. The combination of claim 11 including an interlocking bar mounted on said outer cover plate adjacent one of said locking dogs, said bar being slidable between an inner position and an extended position such that in said inner position said bar abuts said drawing means and prevents said means from drawing said plates together and in said extended position extends through one of said L-shaped slots in said housing adjacent the locking dog extending therethrough thereby preventing relative rotation of said cover assembly with respect to said filter housing.

13. The combination of claim 12 including a plurality of pin members secured to one of said plates and extending through the other of said plates, said pin members having enlarged head portions adapted to abut the other of said plates and to maintain a spacing between said plates less than the transverse dimension of said sealing member.

14. The combination of claim 12 wherein said drawing means comprises a stud secured to said inner cover plate and extending through said outer cover plate and a handle member threadably engaged on said stud such that upon rotating said handle member on said stud said handle member abuts said outer cover plate drawing said plate toward said inner cover plate to press said sealing member outwardly therefrom along said beveled side wall and into sealing engagement with said filter housing.

15. The combination of claim 14 including means carried by said filter housing and said outer cover plate for providing a pivotal mounting of said cover assembly on said filter housing.

16. A cover assembly for a liquid filter housing comprising an outer cover plate having an upper surface and a lower surface, an inner cover plate disposed under and carried by said outer cover plate, said inner cover plate having a diameter less than the diameter of said outer cover plate and defining a beveled side wall, said beveled side wall being spaced from the lower surface of said outer cover plate and with said lower surface defining a groove therebetween, a sealing member disposed in said groove between said outer and inner cover plates and about a portion of said beveled side wall, a plurality of locking dogs secured to said outer cover plate and extending radially therefrom and being adapted to engage the filter housing, a stud secured to said inner cover plate and extending through said outer cover plate, a handle member threadably engaged with said stud such that upon rotating said handle member on said stud said handle member abuts said outer cover plate drawing said plate toward said inner cover plate and squeezing said sealing member therebetween such that said sealing member is pressed outwardly along said beveled side wall and against the housing to form a liquid tight seal between said housing and said cover assembly, and an inner locking bar mounted on said outer cover plate adjacent one of said locking dogs, said bar being slidable between an inner position and an extended position such that in said inner position said bar abuts said handle member and prevents said handle member from rotating on said stud and in said extended position is adapted to engage said filter housing and secure said cover assembly to said filter housing.

* * * * *